(12) United States Patent
Vaughan et al.

(10) Patent No.: US 11,080,162 B2
(45) Date of Patent: Aug. 3, 2021

(54) SYSTEM AND METHOD FOR VISUALIZING AND MEASURING SOFTWARE ASSETS

(71) Applicant: HNL Partners, LLC, Jacksonville Beach, FL (US)

(72) Inventors: Jeremy J. Vaughan, Jacksonville Beach, FL (US); Tracy F. Potts, St. Augustine, FL (US); Michael J. Potts, St. Augustine, FL (US)

(73) Assignee: HNL Partners, LLC, Jacksonville Beach, FL (US)

( * ) Notice: Subject to any disclaimer, the term of this patent is extended or adjusted under 35 U.S.C. 154(b) by 550 days.

(21) Appl. No.: 15/961,854

(22) Filed: Apr. 24, 2018

(65) Prior Publication Data
US 2018/0307580 A1    Oct. 25, 2018

Related U.S. Application Data

(60) Provisional application No. 62/490,005, filed on Apr. 25, 2017.

(51) Int. Cl.
| | |
|---|---|
| *G06F 11/34* | (2006.01) |
| *G06F 11/36* | (2006.01) |
| *G06Q 10/06* | (2012.01) |
| *G06F 11/30* | (2006.01) |

(52) U.S. Cl.
CPC ........ *G06F 11/3495* (2013.01); *G06F 11/302* (2013.01); *G06F 11/3006* (2013.01); *G06F 11/3068* (2013.01); *G06F 11/3082* (2013.01); *G06F 11/3476* (2013.01); *G06F 11/3616* (2013.01); *G06Q 10/06393* (2013.01)

(58) Field of Classification Search
CPC ............ G06F 11/3495; G06F 11/3006; G06F 11/302; G06F 11/3068; G06F 11/3082; G06F 11/3476; G06F 11/3616; G06Q 10/06393
See application file for complete search history.

(56) References Cited

U.S. PATENT DOCUMENTS

| | | | | |
|---|---|---|---|---|
| 9,515,999 | B2* | 12/2016 | Ylonen | ................... H04L 67/42 |
| 2015/0222604 | A1* | 8/2015 | Ylonen | ................... H04L 63/10 |
| | | | | 713/171 |

* cited by examiner

*Primary Examiner* — Bryan Bui
(74) *Attorney, Agent, or Firm* — Camille A. Wilson; Wilson Dutra, PLLC

(57) ABSTRACT

The present disclosure provides generally for a system and method for visualizing and measuring software assets. According to the present disclosure, the system interacts through an API to discover and populate all software applications within an organization in an interface that provides the user real-time information regarding the software applications. The system may provide real-time insights within an organization at all levels, with real-time feedback and metrics on what software there is, how software is being used, and software management options.

16 Claims, 13 Drawing Sheets

SYSTEM AND METHOD FOR VISUALIZING AND MEASURING SOFTWARE ASSETS

CROSS-REFERENCE TO RELATED APPLICATION

This application claims priority to and the full benefit of U.S. Provisional Patent Application Ser. No. 62/490,005, filed Apr. 25, 2017, and titled "SYSTEM AND METHOD FOR VISUALIZING AND MEASURING SOFTWARE ASSETS", the entire contents of which are incorporated in this application by reference.

BACKGROUND OF THE DISCLOSURE

Software is used to facilitate and simplify a variety of tasks unique to each industry with the hope of keeping the daily, weekly, monthly, quarterly, and yearly goals and tasks of a business manageable. This is particularly important where there may be thousands of employees to keep track of, innumerable daily tasks to complete, and shifting goals within any given hour. Because of all the moving parts involved in managing a business, companies usually use more than one software program to stay apprised of their tasks and goals. Some even develop custom software to achieve their goals. Each individual program may be tuned to solve a different particular need and provide a different solution. A company or organization may use programs interchangeably, or use different ones to solve the same need in a different way. As a company grows or changes, so too does its software needs. If software they are using do not meet these needs, the search for software that serves their aims begins again, while other software remains untouched, unused, or underused within the organization.

Organizations and companies may also have systems and solutions built without explicit organizational approval or software not installed by the information technology (IT) department. Typically, shadow IT solutions do not align with an organization's requirements for control, documentation, security, and reliability, creating compliance issues down the line. Shadow IT can also add hidden costs to organizations, create inconsistencies within programs and projects due to the lack of uniformity between programs, produce security vulnerabilities, and cause inefficiencies within a company. Enterprise IT expenditures continually move outside the direct control of IT departments This results in a growing list of software to monitor, update, and maintain. If a company continues to experiment with applications or programs to help them on a daily basis, it is only natural that some will fall by the wayside. As a result of these concerns, information technology asset management (ITAM) serves to help businesses make strategic decision making within the IT environment, focusing on supporting life cycle management for software and hardware. One of the goals of ITAM is to help organizations manage their systems more effectively while saving time and money to avoid unnecessary future purchases. ITAM has the potential to stop projects from progressing that have inaccurate or old information.

Another aspect of ITAM is application lifecycle management (ALM) of computer programs, which helps a business manage and optimize the purchase, installation, implementation, maintenance, utilization, and removal of software applications within an organization. ALM focuses on effective management practices by controlling and protecting software to limit risk and exposure while increasing IT responsiveness and end-user productivity. For example, ALM may track license expirations for companies so companies operate within software compliance regulations. However, the role of a ALM program within an organization can vary widely based on a variety of factors, such as portfolio size, existing infrastructure, and available resources. Many ALM programs focus on reallocating underutilized software licenses within the company, enforcing compliance with terms and conditions, automating IT processes, and improving worker productivity.

SUMMARY OF THE DISCLOSURE

What is needed is a user-friendly, intuitive visualization system that provides a method for real-time insight to users within an organization at all levels, with real-time feedback and metrics on what software there is, how software is being used, and software management options. These users may collaborate with others across the organization within the system to implement changes, brainstorm further ideas on managing software or projects, track progress, and rapidly affect change in the organization within their permission levels. As an organization accrues software, the software itself may be ranked, evaluated, or graded based on usability, reliability, benchmarks, and other factors. Upon installation, the system may integrate with whatever other software is in the system through an application programming interface (API) or hardware installed on-site to provide a fuller picture of what software a company has and how the software is being used.

These insights and functionality may be available within one central location, such as a dashboard interface, that may be accessed by anyone within an organization. Depending on the user's position within a team or within an organization, they may have access to multiple sources of information for a team. For example, a user may have access to budgeting or forecasting tools, product management tools, or operation tools. A user may create reports on each aspect that they would like to drill into, with the program able to identify risks the user should be aware of while providing actionable items that a user may set into motion immediately, by the system's recommendation, or at a time to be implemented by the system. These reports may also provide information on schedules, projects, internal team or external vendor productivity, what software has had issues, and event tracking.

The present disclosure relates to a software business management system for visualizing and measuring software assets, wherein the system may include a discovery tool installable on one or more organization servers, an integration engine, and an analytics engine. In some aspects, the discovery tool may be configured to access an organization environment; identify a plurality of organization applications, monitor the plurality of organization applications, and collect organization application data. In some embodiments, the integration engine may be configured to convert or translate the organization application data into universal data, where the universal data includes a common format; and store the universal data in an external data warehouse. In some implementations, an analytics engine may be configured to access the external data warehouse and analyze the universal data, where an analysis output includes insights related to the plurality of organization applications.

In some aspects, the organization application data may comprise user-generated data. In some embodiments, the discovery tool may be further configured to score the plurality of organization applications. In some implementations, the discovery tool may be further configured to identify inventory within the organization environment; monitor the inventory; and collect inventory data. In some aspects, the analysis may include a performance analysis of at least a portion of the organization applications. In some embodiments, the system may comprise an administrative interface, where the analytics engine may be further configured to create reports based on the insights, and where the reports are viewable in the administrative interface.

In some aspects, the system may further include at least one authentication mechanism, where the at least one authentication mechanism may secure a transmission of organization application data from the organization servers to the external data warehouse. In some embodiments, the scanner may be further configured to transmit at least a portion of the organization application data to the external data warehouse. In some implementations, the analysis may include identifying outlier data within the universal data and separating the outliers into acceptable departures and unacceptable departures. In some embodiments, the analysis may include a software decay assessment of at least one of the plurality of organization applications, where the software decay assessment may be based at least in part on the outlier data.

In some implementations, the present disclosure may relate to a method for visualizing and measuring software assets, where the method may include the method steps of: accessing an organization environment; identifying a plurality of organization applications; monitoring the plurality of organization applications; collecting organization application data; converting or translating the organization application data into universal data, where the universal data includes a common format; storing the universal data in an external data warehouse; and analyzing the universal data, where an analysis output includes insights related to the plurality of organization applications.

In some embodiments, the organization application data may include user-generated data. In some aspects, the method may comprise scoring the plurality of organization applications. In some implementations, the method may comprise identifying inventory within the organization environment, monitoring the inventory, and collecting inventory data. In some aspects, the analysis may include a performance analysis of at least a portion of the organization applications. In some implementations, the method may further include creating one or more reports based on the insights, where the reports may be viewable in the administrative interface. In some embodiments, the accessing may occur through at least one authentication mechanism, where the at least one authentication mechanism may secure a transmission of organization application data from the organization servers to the external data warehouse.

In some implementations, the method may further include transmitting at least a portion of the organization application data to the external data warehouse. In some aspects, the analyzing may include identifying outlier data within the universal data and separating the outliers into acceptable departures and unacceptable departures. In some embodiments, the analyzing may further include a software decay assessment of at least one of the plurality of organization applications, where the software decay assessment may be based at least in part on the outlier data.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

Figure 1:
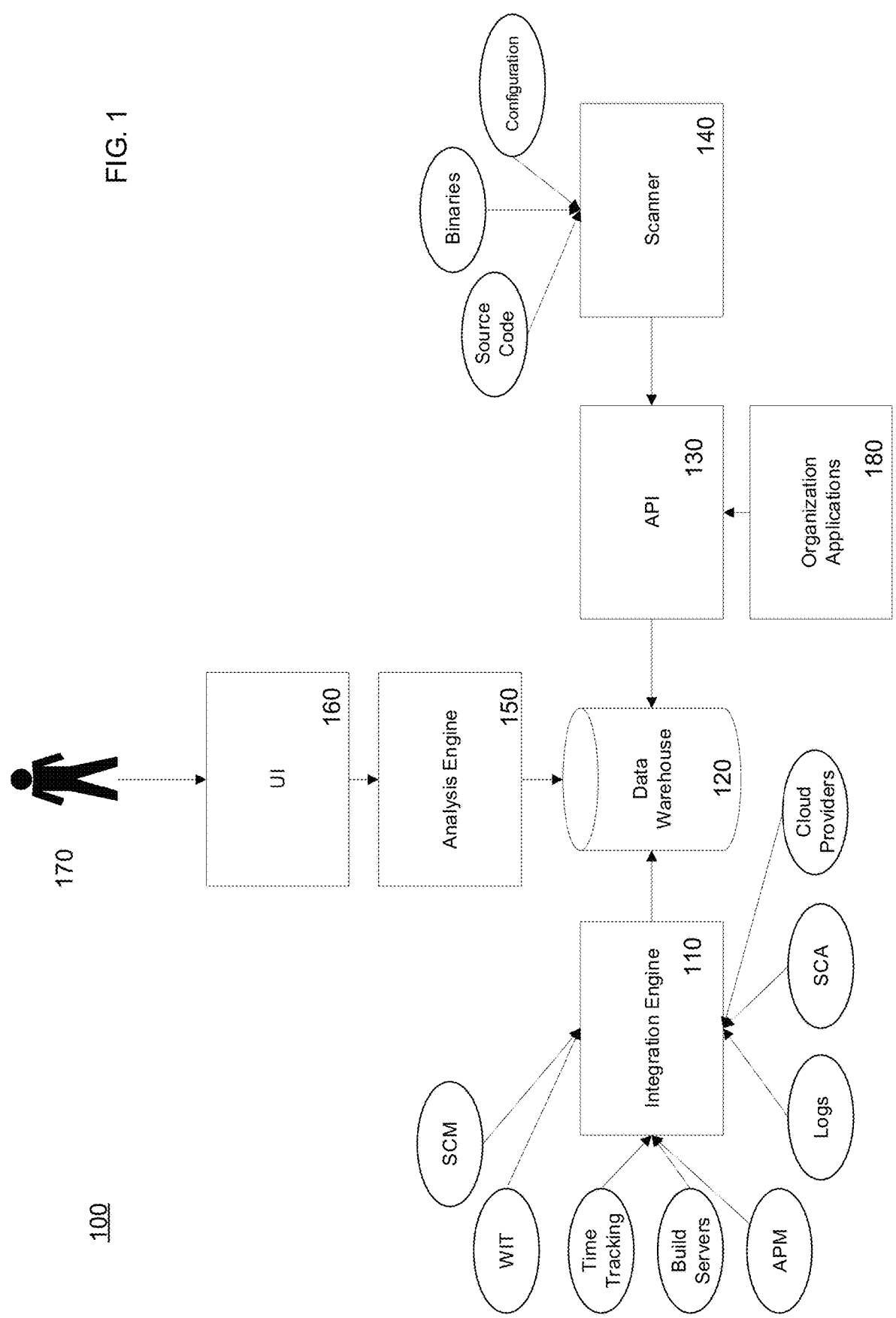
FIG. 1 illustrates a functional block diagram of an exemplary software business management system

The present disclosure provides generally for a system and method for visualizing and measuring software assets. According to the present disclosure, the system interacts through an API to discover and populate all software applications within an organization in an interface that provides the user real-time information regarding the software applications. The user is provided with a variety of options for navigating and acting on these applications, described below.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Insight: as used herein refers to data obtained or derived that, once analyzed, allows a software business management system to provide actionable information about the software being analyzed. Insights may include cost, quality, risk and security vulnerabilities that may be associated with a particular application, type of platform, or user group, as non-limiting examples.

Inventory Discovery: as used herein refers to a discovery tool that may be integrated into a system, wherein the discovery tool may identify, locate, and monitor stored files and data. Inventory discovery may allow an organization to have visibility of data throughout applications and users.

Software Discovery: as used herein refers to a discovery tool that may integrated into a system, wherein the discovery tool may identify, locate, and monitor software that may interface with the system. In some aspects, the discovery tool may identify one or both software stored within the system or software that interfaces with the systems.

Software Decay: as used herein refers to decreasing effectiveness of software over time. In some aspects, software decay may significantly impact the usefulness of the software, which may create susceptibility and inefficiencies in a business. Identifying and isolating software decay may allow a business to directly address the software decay, such as by excising, replacing, or updating the software.

Software Governance: as used herein refers to a business concept specific to the rules, procedures, and requirements for how a company or organization may use software within their business model. In some organizations, employees and contractors at a variety of levels may have the capability to install or edit software on business systems. Software governance may allow an organization to control and monitor software installed in the system. Software governance may allow an organization to maintain compliance with industry regulations, such as the Payment Card Industry Data Security Standard (PCI) or Health Insurance Portability and Accountability Act (HIPAA) compliance.

Software Business Management: as used herein refers to a business management system based on software applications utilized by the business, wherein software analytics may be used to develop business strategy related to the implementation of software within the business. In some aspects, software governance may comprise a rule set, and software business management may comprise the strategy.

Score: as used herein refers to a derived metric that may represent the relative value score of a software application. In some aspects, inputs to calculating the score may be normalized data values from a data warehouse. In some embodiments, the output of the score calculation may be a point-in-time numerical value that may be useful to compare applications to one another. In some implementations, the score may factor in metrics such as the size, quality, risk, activity, and performance of the application.

Product Economics: as used herein refers to the process of determining the economics of a product in its current state while considering cost and net benefit. In some aspects, product economics may allow software business management system to define the cost necessary to maintain current net benefit, allowing for a determination as to whether the economics of the current product may be improved by either increasing net benefit or reducing cost necessary to achieve better economics.

Economic Modeling: as used herein refers to an activity focused on understanding product economics in specific scenarios. For example, a company may be considering spinning out an internal application into its own product/company. Used internally, the product may have a different economic model than if spun out of the organization.

Threat Intelligence: as used herein refers to the potential security vulnerabilities that may be found in either the software or the dependencies, tools, frameworks or languages used to create the software.

Software Development Life Cycle (SDLC): as used herein refers to a dashboard of information allowing technology leaders to see how well their entire software development organization may be performing.

Referring now to FIG. 1, a functional block diagram of an exemplary software business management system 100 is illustrated. In some embodiments, a software business management system 100 may comprise an analytics tool designed to provide insight specific for organizations dependent on software within their organization. In some aspects, insight may allow companies to benefit from the use of custom software from valuation to benchmarking. In some implementations, metrics may guide organizations to achieving a higher value business through better decision making around their customer software assets.

In some aspects, software business management may rely on data, which may comprise a variety of forms from a range of sources, including, for example, external APIs 180, external databases, system API 130, and user-provided data.

Some examples of external API 180 sources may include source control management (SCM), work item tracking (WIT), time tracking, build servers, application performance monitoring (APM) tools, error logs, static code analysis (SCA) tools, cloud providers, and any other data sources surrounding software development and management that have APIs available. In some aspects, authentication may be used to connect to these external APIs 180 to limit storage of sensitive credentials. For example, authentication mechanisms may include shared access signatures (SAS), personal access tokens, API keys, as non-limiting examples.

External databases may include vulnerability databases, dependency repositories, product version data, open source code repositories, and other similar sources of data about software versions and vulnerabilities that are externally maintained.

In some aspects, a system API 130 may serve three primary functions: to allow customers to push data into the software business management system 100 via organization applications, to enable a software business management system scanner 140 to push data into the software business management system 100 from behind an organization's firewall, and to allow customers to pull data out of the software business management system 100 for reporting purposes. In some embodiments, the software business management system scanner 140 may comprise an application that may run at build time on an organization's build server to analyze their source code, binaries, and configuration to glean useful information, such as framework versions, dependencies, database discovery, as non-limiting examples. In some aspects, the software business management system scanner 140 may take this information and push it into the software business management system 100 via the software business management system API 130. In some embodiments, plug-ins may be used for various build servers to facilitate the adoption of the software business management system scanner 140.

In some aspects, the software business management system scanner 140 may be installed on organization build servers. The software business management system scanner 140 may apply standard and proprietary algorithms to organization source code, which may be used to generate data for an analysis engine 150. The software business management system scanner 140 may be useful where an organization may not permit their source code to leave the organization environments. In some aspects, the software business management system scanner 140 may exist within the organization environments and constantly analyze the source code.

From there, the software business management system scanner 140 may push the generated or computed data, in contrast to source data, up to a data warehouse 120, which may utilize secure connections.

In some aspects, the software business management system may receive user-provided data, which may include manually entered data that a user 170 may input via a software business management system UI 160. For example, user-provided data may comprise a cost worksheet with costs needed to develop and run an application, collaboration discussions, key events, and portfolio assignments.

In some embodiments, receipt of data may initiate analysis. In some aspects, additional data access may expand the analytic capabilities of the software business management system 100. In some implementations, the data may be converted or translated via the software business management system integration engine 110 into a common, unified format in the software business management system data warehouse 120. An integration engine 110 may allow for universal treatment of different data providers despite them having different forms of APIs 130.

Once the data is in a unified format in a software business management system data warehouse 120, the software business management system analysis engine 150 may apply mathematical and statistical algorithms to the data to extract meaningful information. The algorithms may span from simple summations over a time series to machine learning (ML) algorithms such as Naïve Bayes classifiers and least squares linear regression, as non-limiting examples. In some embodiments, the analysis engine 150 may be programmed to detect outliers in data that may represent a mere departure from the norm or a severe cause for concern.

In some aspects, the detections may be transformed into insights that may be presented to the user 170 as alerts. Users 170 may also receive email notifications of insights as they are discovered. The output of this analysis may be made available to the software business management system UI 160 for use in charts and other visualizations.

Figure 2:
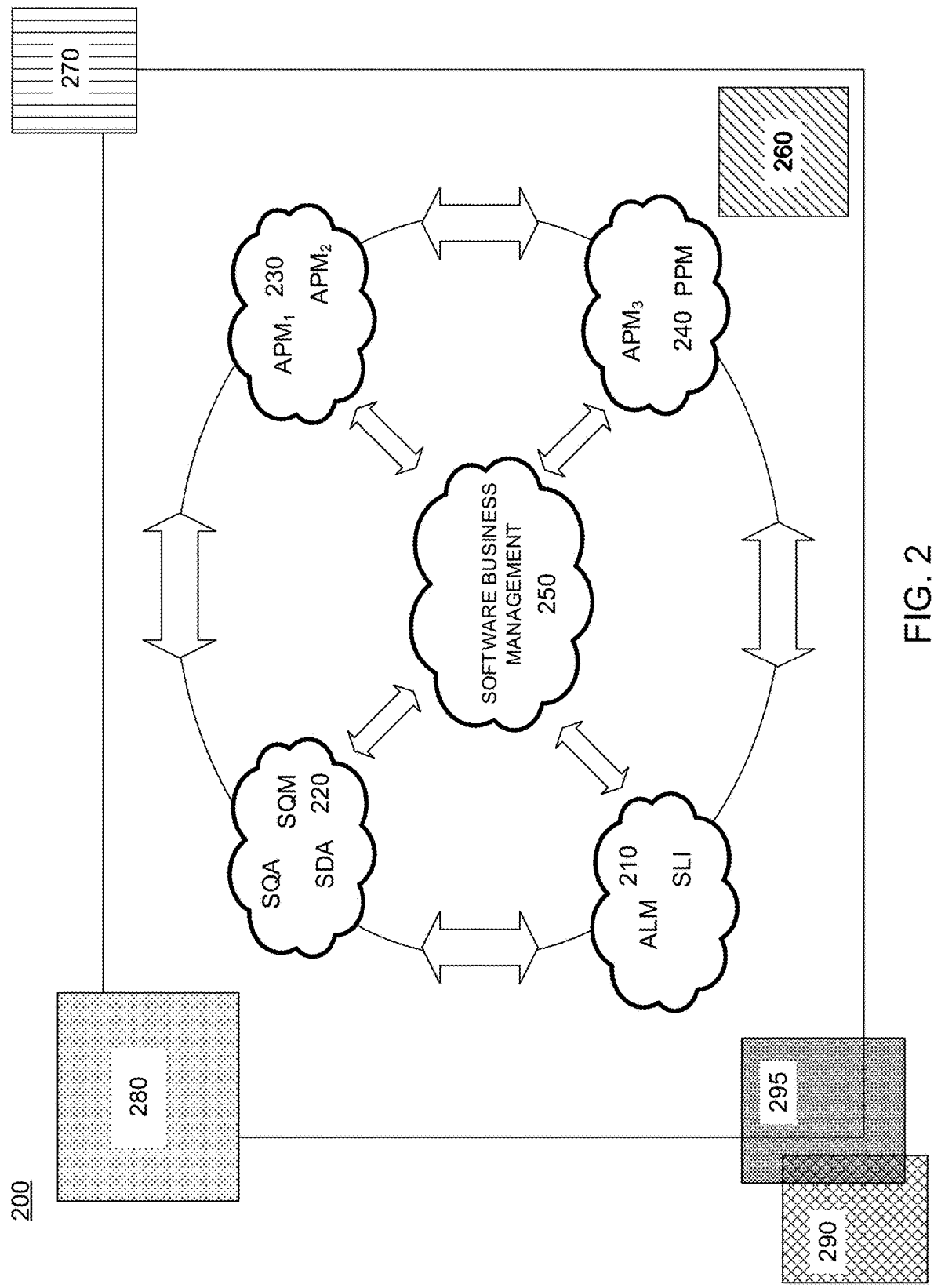
FIG. 2 illustrates an exemplary software business management system infrastructure.

Referring now to FIG. 2, an exemplary software business management system infrastructure 200 is illustrated. In some aspects, organization software 260, 270, 280, 290, 295 may be analyzed by a series of analytic and management mechanisms 210, 220, 230, 240. In some aspects, at 210, application lifecycle management and software integration analysis and management may occur. At 220, software quality analytics, software quality measurement, and software development analytics and management may occur. At 230, application performance management and application performance monitoring may occur. At 240, application portfolio management and project portfolio management may occur.

In some embodiments, a software business management system 250 may access and monitor fully-contained software 260, wherein the system API may store and control the fully-contained software 260. In some aspects, the software business management system 250 may access partially-controlled software 270, 280, wherein a portion of the partially-controlled software 270, 280 may be located within the software business management system. In some implementations, the software business management system 250 may access linked software 290, 295, which may interface through a partially-controlled software, fully-contained software, through an authorization mechanism, or combinations thereof. In some embodiments the software business management system 250 may monitor software for inefficiencies.

In some aspects, the software business management system 250 may expedite access to more complete information as it relates to the technology in question. In some embodiments, the software business management system 250 may use static code analysis to perform code analysis. In some implementations, the software business management system 250 may integrate with existing tools used within an organization. In some aspects, once integrated, the software business management system 250 may develop economic models for products within the organization. In some embodiments, the software business management system 250 may provide a value-at-risk for each product within the economic models developed for each product.

For example, a buy-side organization in a merger and acquisition may collaborate with a sell-side organization by using the software business management system 250. The software business management system 250 may allow these sides access to see information gathered in a due diligence phase, track the diligence process, and discover where teams have remediation plans to improve code. The software business management system 250 may measure economic models over time to provide greater insight for the negotiations. This may allow for more successful merger and integration phases.

As another example, an incoming chief officer of a company typically has due diligence and transparency obligations coupled with objective data and collaboration needs. The software business management system 250 may provide onboarding and insight to the incoming officer regarding the software portfolio's current state and value without the learning curve associated with a chief officer's first 100 days. In some implementations, this may come in the form of the software business management system 250 identifying the strategic opportunities, portfolio strengths and weaknesses, and where to invest for the chief officer.

Figure 3:
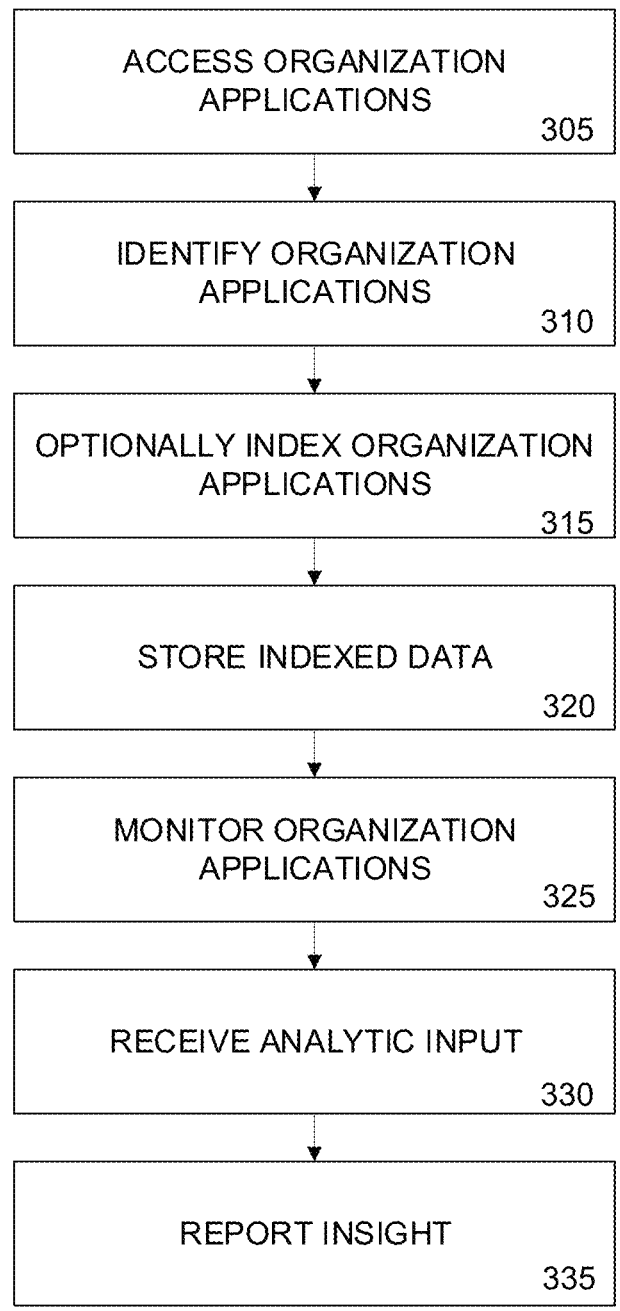
FIG. 3 illustrates exemplary method steps for software business management.

Referring now to FIG. 3, exemplary method steps for software business management are illustrated. At 305, organization applications may be accessed. In some aspects, an authorization mechanism may be required. At 310, organization applications may be identified, such as through software discovery. At 315, organization applications may be normalized. In some implementations scoring may allow for universal comparison between different platforms, application types, and application brands. At 320, normalized data may be stored, and at 325, organization applications may be monitored. At 330, an analytic input may be received, and at 335, insight may be reported.

In some aspects, inventory discovery may identify and locate files associated with or stored through organization applications. In some embodiments, at 325, the monitoring may detect software decay, which may identify applications that may be losing effectiveness. Loss of effectiveness may be caused by one or more factors, such as outdated software, outgrowing the limitations of the software, changing platforms, new software with overlapping functionality, a decrease in the need for or use of the software, frequent crashes, error logs, or incompatibility, as non-limiting examples.

Figure 4:
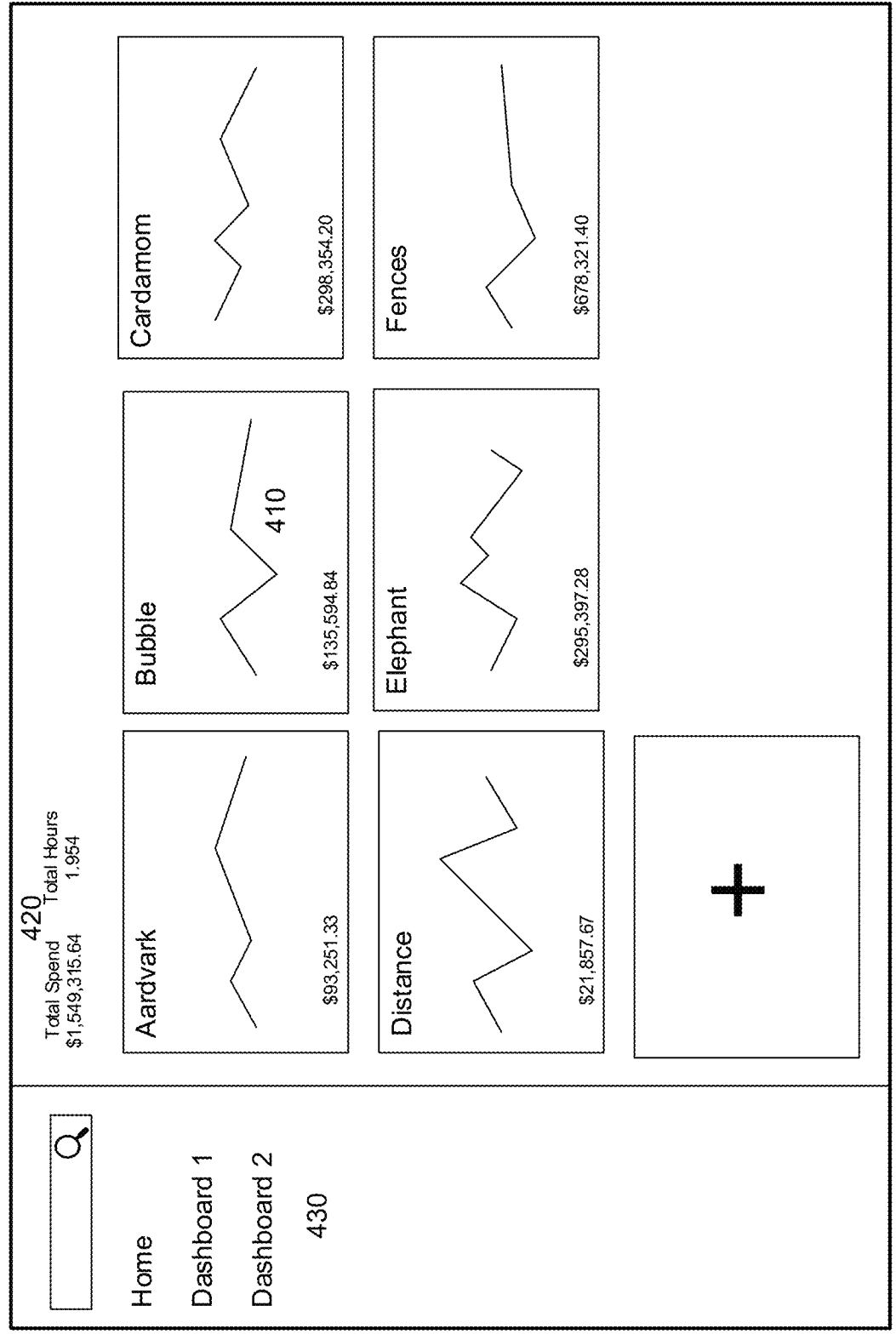
FIG. 4 illustrates exemplary software business management graphical user interface (GUI).

Referring now to FIG. 4, an exemplary software business management graphical user interface (GUI) 400 is illustrated. In some aspects, a software business management GUI 400 may present general monitoring visualizations 410 for one or more of the organization applications and snapshot analytics 420 that may present information that a user or organization may consider a priority. The software business management GUI 400 may comprise a user menu 430, which may allow a user to navigate the software business management system.

In some aspects, vulnerabilities may be delivered via a software business management GUI 400. In some embodiments, the software business management GUI 400 may communicate the total number of vulnerabilities in the entire software portfolio and allow organizations to search for specific vulnerabilities. In some implementations, the system may allow users to delegate the work of addressing vulnerabilities to track and ensure the vulnerabilities are being addressed. In some aspects, the system may display a remediation panel, which may communicate the average time taken to resolve vulnerabilities found.

In some embodiments, a software business management GUI 400 may illustrate information related to software development lifecycle (SDLC). In some aspects, in places where the organization may not be performing well, the system may use alerts and icons to make clear that something is not performing as expected or within acceptable parameters. In some embodiments, this may allow technology leaders to focus their time on the areas of the software develop organization that most need attention first.

Figure 5:
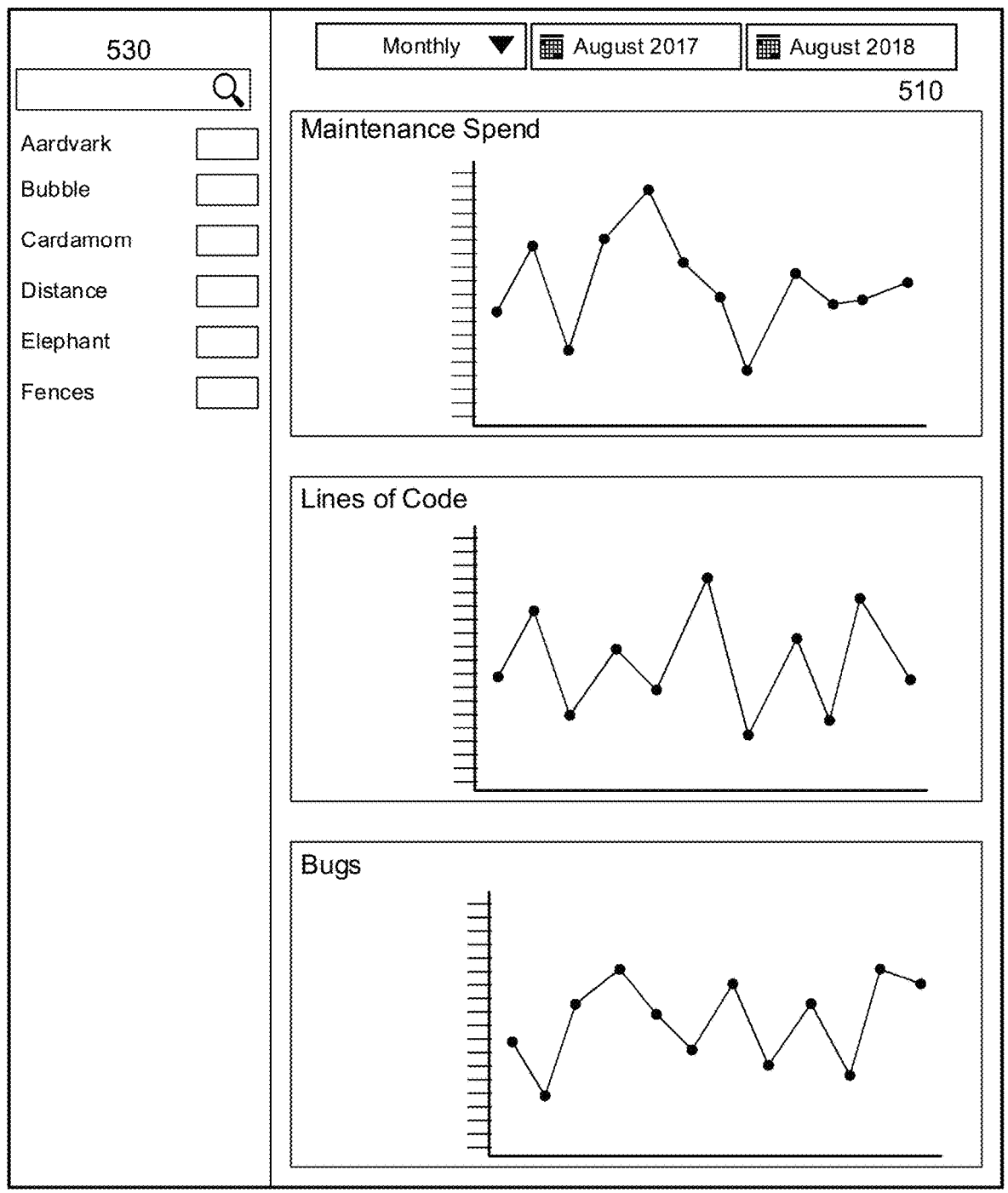
FIG. 5 illustrates exemplary software business management graphical user interface (GUI).

Referring now to FIG. 5, an exemplary software business management graphical user interface (GUI) 500 is illustrated. In some aspects, a software business management GUI 500 may present detailed monitoring visualizations 510 for one or more of the organization applications and filter or view options 520 that may allow a user or organization to customize the visualization. The software business management GUI 500 may comprise a secondary visualization 530, which may allow a user to view limited details for a large selection of organization applications.

Companies that have custom software may require an ever-growing list of tools to be successful and efficient. The landscape of tools may constantly grow and change, as the field progresses. In some embodiments, the software business management system may adapt, evolve, and grow with the industry.

In some aspects, the software business management system may utilize a two-stage data warehouse, wherein data from the external data sources may be pulled into the first stage of the data warehouse. This may both capture the data in its native form and ensure that if the tool goes down, or goes away, the data that was previously generated by that tool, software, or platform may still be accessible, which may be critical to long term analytics, through updates or firmware, or by predictive or prescriptive functionality.

In some embodiments, through machine learning, the software business management system may create more efficient software structure on its own or by approval from a user. In some implementations, a software business management system may write code to implement on its own based on prior builds. For example, custom software implemented within an organization may cause more system crashes than prior builds did. A software business management system, using former code, may create lines of code to solve the crashing issue based on a more stable build, or by discovering and writing code for what may be a more stable build. In some aspects, a software business management system may generate lines of code for a software engineer who may guide a software business management system in implementation or on what problems to solve. In some embodiments, a software business management system may detect software decay and develop code to ensure the continued viability of the affected software.

Generally, over time, companies and organizations may lose historical data when the organization changes tools. For example, if a company has been using one product for project management, but changed over to a second product for similar functionality, companies may lose the historical data from the original product, making it difficult to measure the whole history of the projects and difficult to compare the effectiveness of the two products. In some aspects, the software business management system may capture the core data components in the first stage of the warehouse, making it easy for clients to change tools without losing their history.

Customarily, software tools use their own language and terminology and organization may differ between tools. In some embodiments, the software business management system may create a translation of the languages and terminology, wherein the translation may allow for a one to one comparison of effectiveness and efficiency between software. In some aspects, the software business management system may establish baseline standards of technical cost, quality, risks, and vulnerabilities of a software portfolio. In some embodiments, the baseline may be based on the custom needs and efficiency goals of a particular organization. In some aspects, a general baseline may initially establish baselines across an industry, platform type, or specific applications, as non-limiting examples. A general baseline may evolve over time, adapting to input goals or machine learning from organizational changes.

In some embodiments, artificial intelligence and machine learning may be utilized to dynamically present analytic reporting and insights to a user. In some embodiments, correlations in the data across platforms may allow users to review analytics without requiring separate access to each application in the software portfolio.

In some aspects, general external data sources may be pulled into the data warehouse, wherein the two-stage warehouse system may limit vulnerability to security breaches and loss of historical data. In some embodiments, security mechanisms may be integrated into the software business management system, such as limiting storage of user credentials to external services in the database and instead create authentication tokens or encrypt API keys, personal access tokens, or passwords in the database, such as through AES encryption. In some implementations, traffic from the software business management system may be transmitted via API over HTTPS, ensuring that communication is encrypted.

For example, the software business management system login information may utilize secure PBKDF2 hashing of salted passwords so that, in the event one or both database is compromised, the password may not leak. The database may be transparently encrypted at rest and in transit, as well as the storage account. In some aspects, onsite appliance versions of the software business management system may add another level of security.

Figure 6:
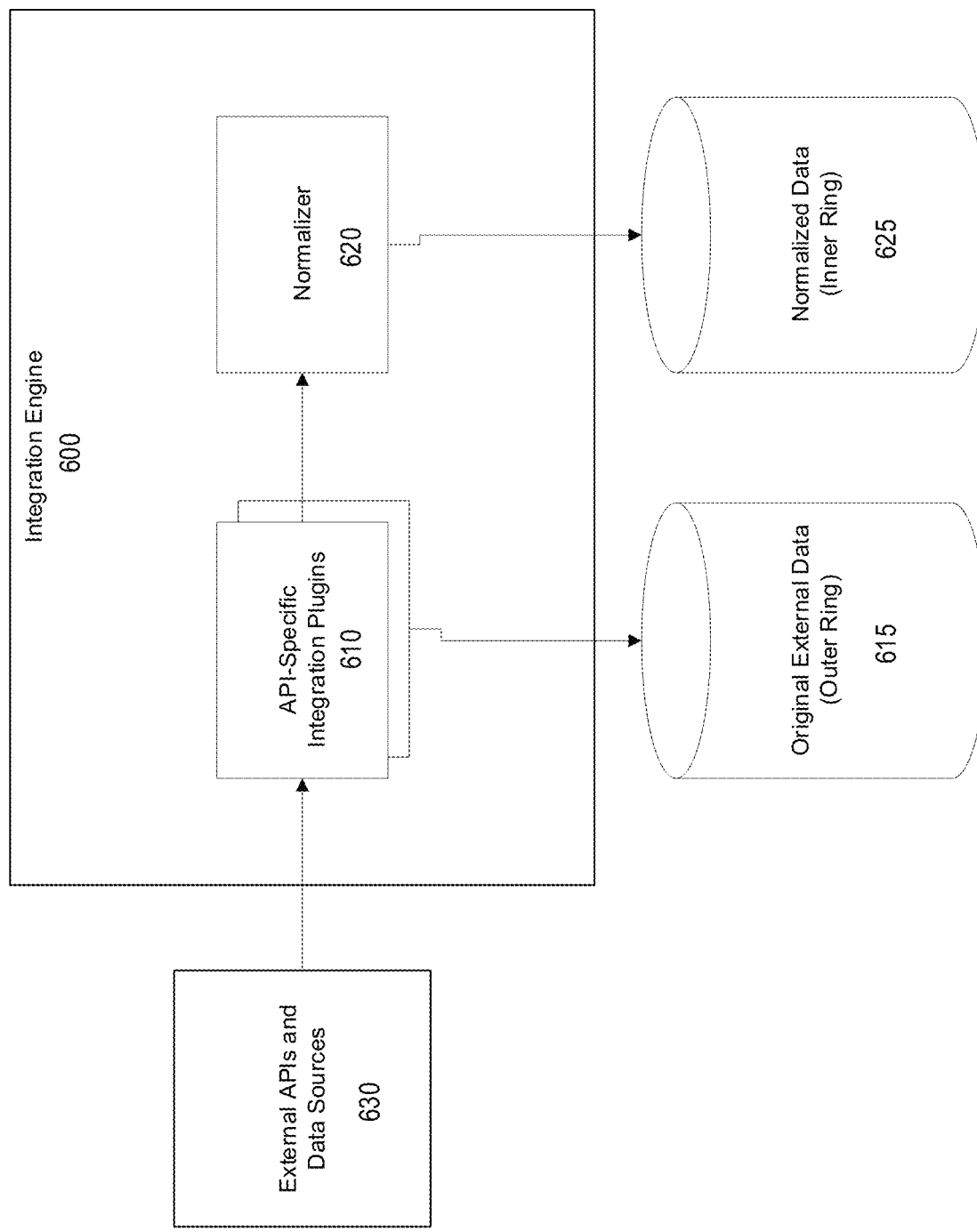
FIG. 6 illustrates apparatus that may be used to implement aspects of the present disclosure including executable software.

Referring now to FIG. 6, an exemplary integration engine 600 for use in a software business management system is illustrated. In some aspects, an integration engine 600 may comprise API-specific integration plug-ins 610, which may be specific to a vendor or platform type. In some embodiments, the integration engine 600 may receive external APIs and data sources 630 from an external source and the integration engine 600 may comprise a normalizer mechanism 620 that may allow for a uniform comparison of analytics and insights over different platforms. In some aspects, the API-specific integration plugins 610 may receive and process original external data 615 from an external database, such as an organization database or a vendor database. In some implementations, normalized data 625 may be stored in an inner ring database, wherein the content of the original external data 615 may not be stored limiting security vulnerability.

Figure 7:
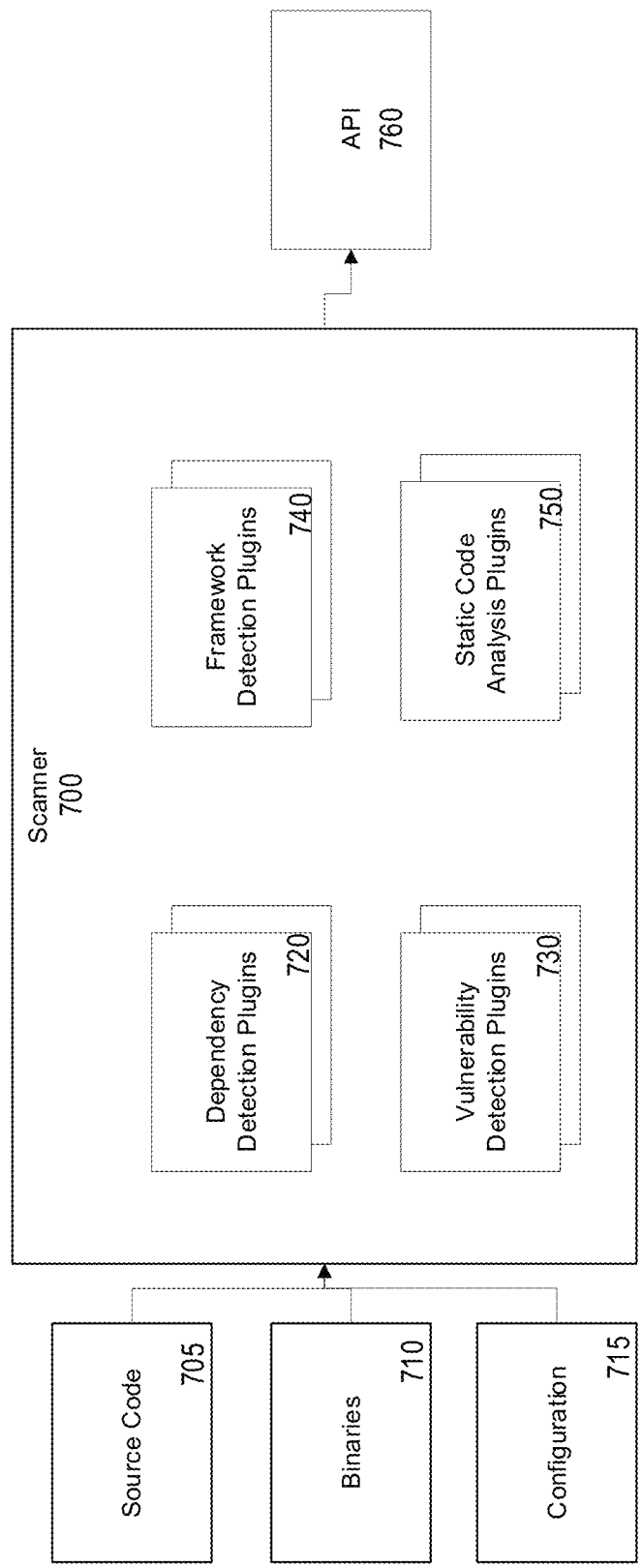
FIG. 7 illustrates an exemplary scanner for use in a software business management system.

Referring now to FIG. 7, an exemplary scanner 700 for use in a software business management system is illustrated. In some embodiments, a scanner 700 may receive source code 705, binaries 710, and configuration 715 from an external source, such as organization applications. In some aspects, the scanner 700 may comprise dependency detection plugins 720, vulnerability detection plugins 730, framework detection plugins 740, and static code analysis plugins 750, as non-limiting examples. In some implementations, the scanner 700 may transmit data to an API 760 of the software business management system.

Figure 8:
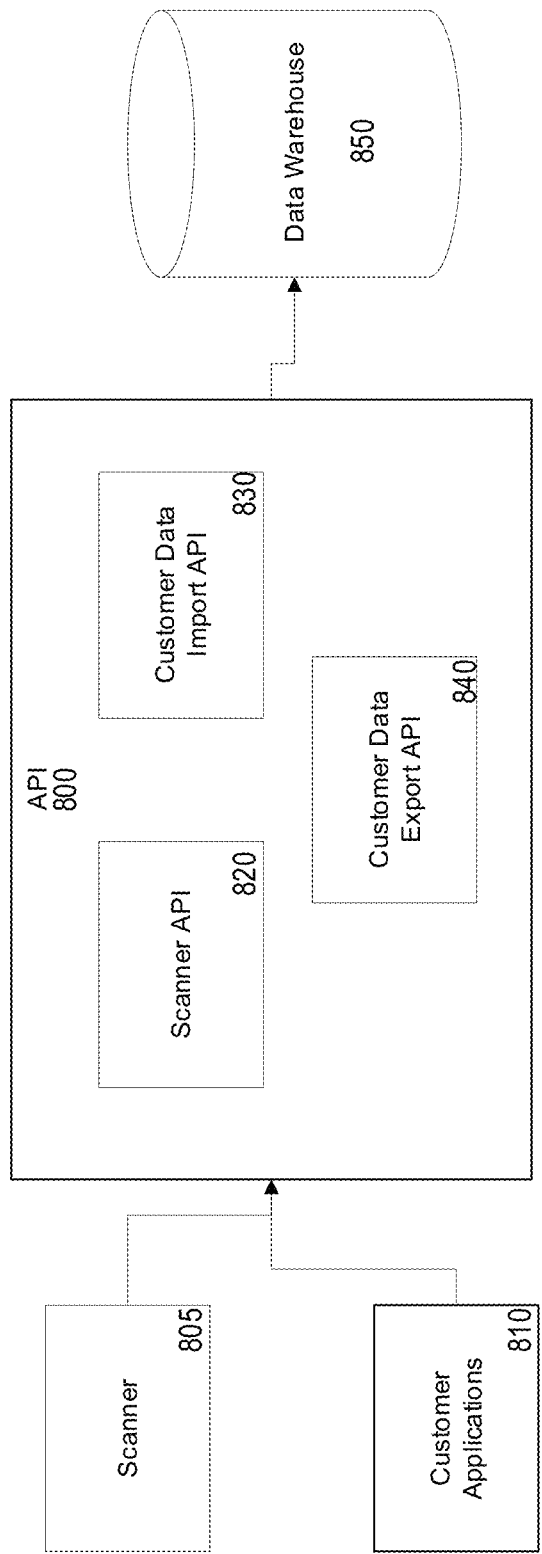
FIG. 8 illustrates an exemplary API for use in a software business management system.

Referring now to FIG. 8, an exemplary API 800 for use in a software business management system is illustrated. In some aspects, the API 800 may receive data from one or both a scanner 805 or organization applications 810. In some embodiments, the API 800 may comprise a scanner API 820, customer data import API 830, and customer data export API 840, as non-limiting examples. In some implementations, the API 800 may transmit data to a data warehouse 850, which may store analyzed and sorted data for the software business management system.

Figure 9:
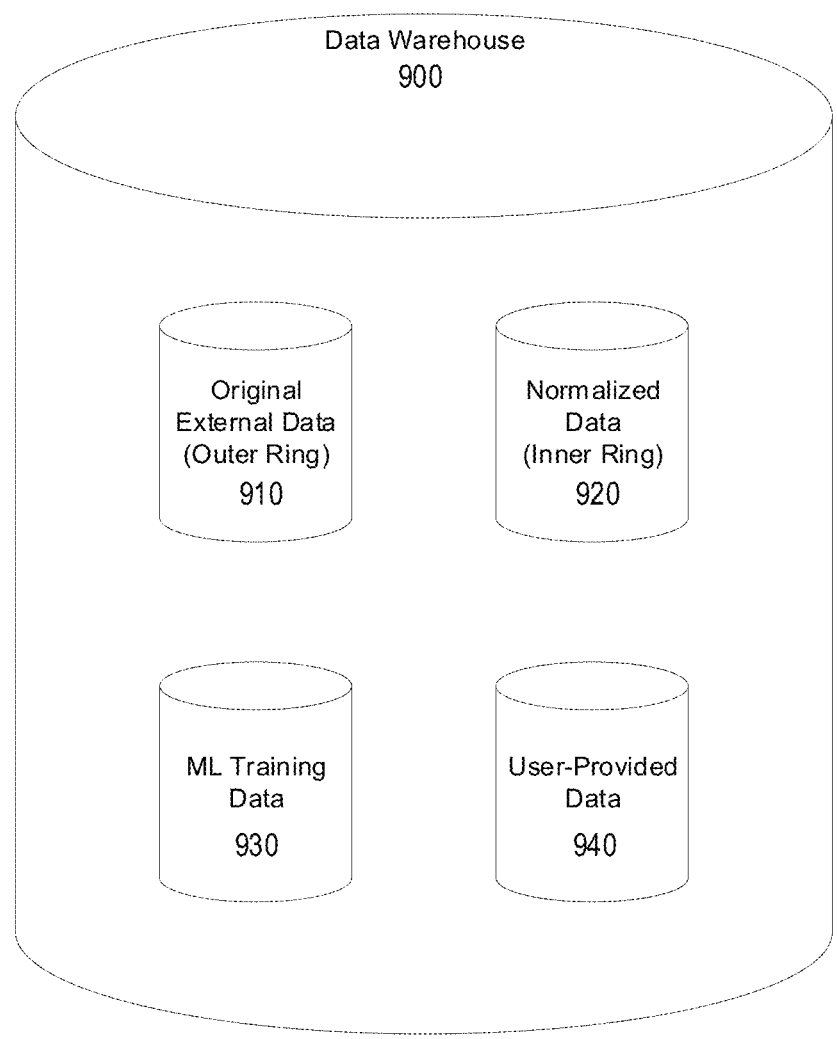
FIG. 9 illustrates an exemplary data warehouse for use in a software business management system.

Referring now to FIG. 9, an exemplary data warehouse 900 for use in a software business management system is illustrated. In some aspects, the data warehouse 900 may comprise a two stage database that may allow for a separate storage for data with differing security needs. Within the data warehouse 900, via the integration engine's normalizer, data may be transformed from its original representation as it was retrieved from an API ("outer ring") into a common, normalized format 920 ("inner ring") that may account for discrepancies between varying vendors of external data sources. The normalizer may use extract, transform, and load (ETL) techniques to transform the external data to the normalized form.

For example, original external data 910 may be stored in an outer ring and may be temporarily stored during the analysis and processing, and normalized data 920 may be stored in an inner ring, wherein the content of the original external data 910 may be separated from the normalized data 920 and analytics related to the normalized data 920. In some implementations, the data warehouse 900 may comprise machine learning training data 930, which may allow the software business management system to provide adaptive analysis that may provide more precise and customized insights over time. In some embodiments, machine learning training data 930 may be used to develop intelligent infrastructure for custom software based on analytics, insights, and identified and analyzed inefficiencies, vulnerabilities, software decay, as non-limiting examples. In some aspects, the data warehouse 900 may store user-provided data 940, which may include organization information, profile information, organization application authorization information, as non-limiting examples.

Figure 10:
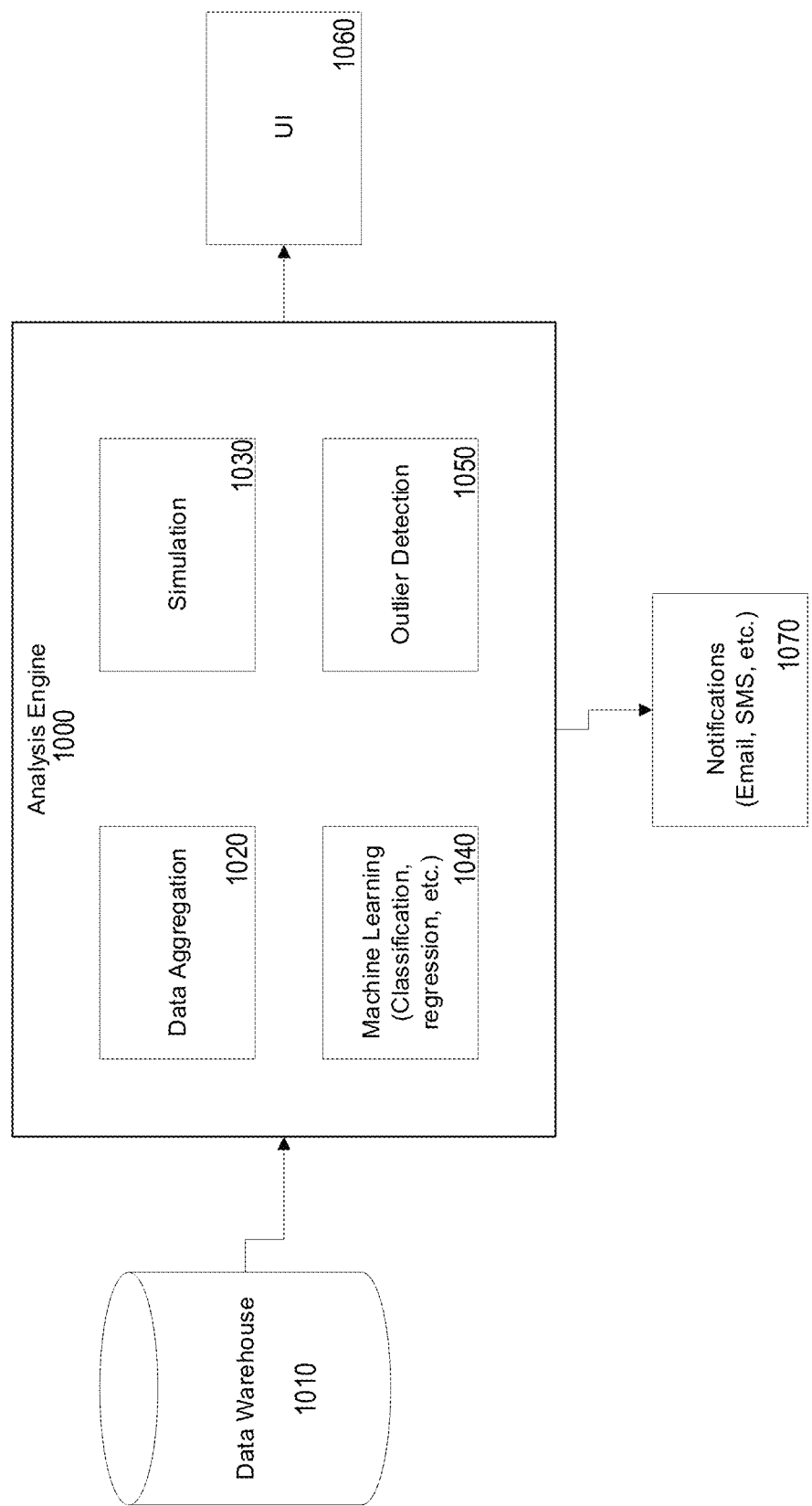
FIG. 10 illustrates an exemplary analysis engine for use in a software business management system.

Referring now to FIG. 10, an exemplary analysis engine 1000 for use in a software business management system is illustrated. In some aspects, the analysis engine 1000 may receive data from a data warehouse 1010, which may be external or integrated into the software business management system. In some embodiments, the analysis engine 1000 may comprise data aggregation 1020, simulation 1030, machine learning 1040, and outlier detection 1050, as non-limiting examples. In some implementations, notifications 1070 may be transmitted to designated users, such as executives in an organization. In some aspects, the analysis engine 1000 may receive input from a UI 1060 within the software business management system.

In some embodiments, an UI 1060 may comprise configurable dashboards visualizing key metrics for products and portfolios based on the data in the system. Visualization may include the software business management system score, cost data, budgets, quality analysis, SCA issues, lines of code, hours spent, commits to source code repositories, features, bugs, errors, performance data, frameworks, dependencies, duplicate lines of code, technical debt, communication activity, discussions, attachments, security vulnerabilities, build status and time, number of branches, derived ratios of metrics, ML classifications, team members, key events, and other outputs from the analysis engine 1000. These metrics may be visualized via a display of the metric, on a chart (such as line, bar, pie, etc), in a table, or otherwise. The UI 1060 may be customized to the needs of the user. The user may change the current time slice to view data in a different time period and compare time periods to one another (i.e. year-over-year).

Figure 11:
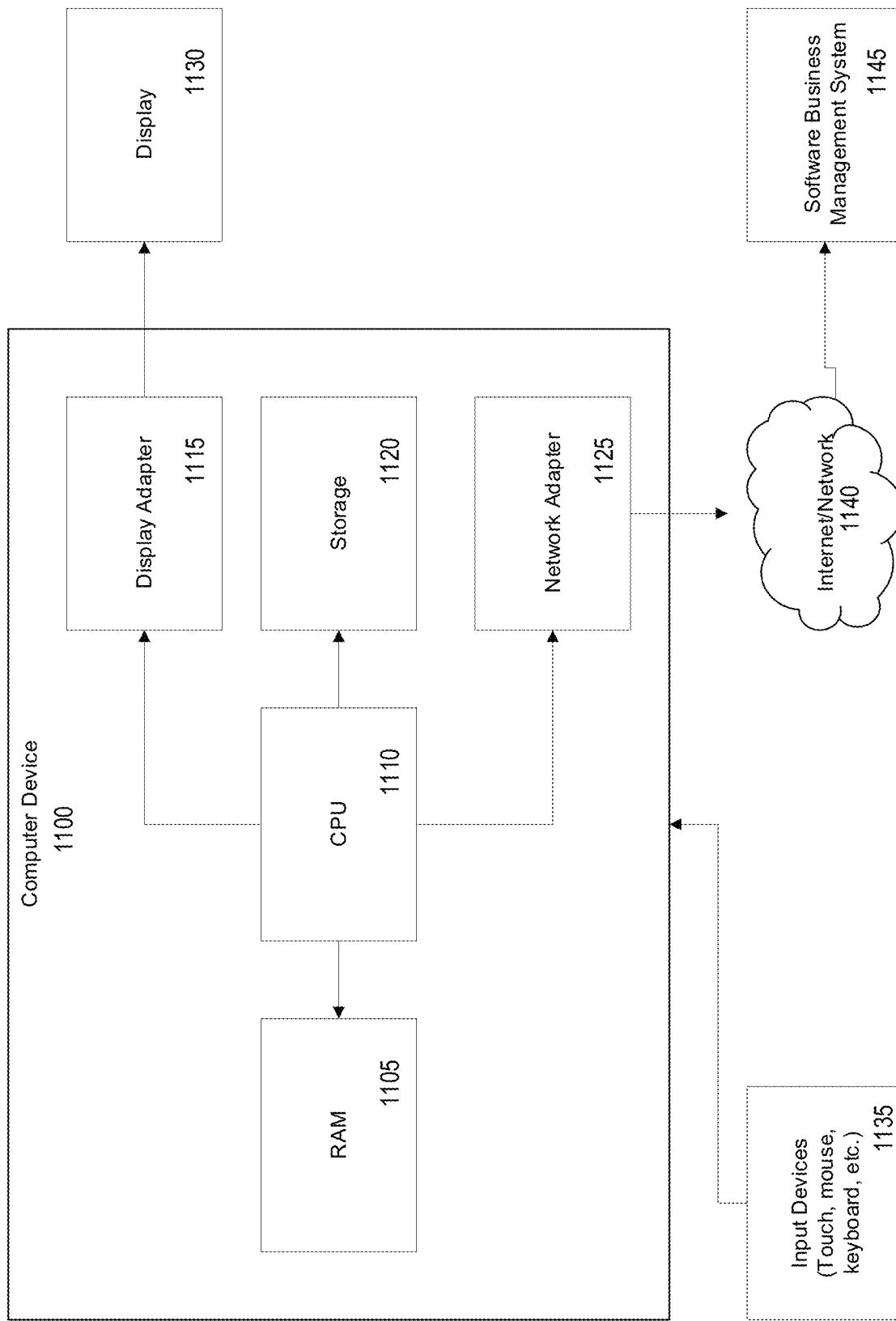
FIG. 11 illustrates an exemplary computer device for use with a software business management system.

Referring now to FIG. 11, an exemplary computer device 1100 for use with a software business management system 1145 is illustrated. In some aspects, a computer device 1100 may comprise a display 1130, RAM 1105, and a CPU 1110, which may operate with a display adapter 1115, storage 1120, and network adapter 1125, as non-limiting examples. In some embodiments, the computer device 1100 may receive input commands from an input device 1135, such as a mouse, touchscreen, or keyboard. In some implementations, the computer device 1100 may communicate with the software business management system 1145 through a wired or wireless network 1140. A computer device 1100 that may be capable of accessing a network 1140 may be used to access the software business management system 1145. The computing device 1100 may comprise a CPU 1110 and memory (RAM) 1105 with storage used for temporary files. The computing device 1100 may have a display adapter 1115 and internal or external display 1130 to view the system's UI, wherein the computer device 1100 may support user input 1135 via a touch screen, mouse, or keyboard so the user may interact with the UI. A network adapter 1125 may be used to access the system over the Internet and/or a private network.

Figure 12:
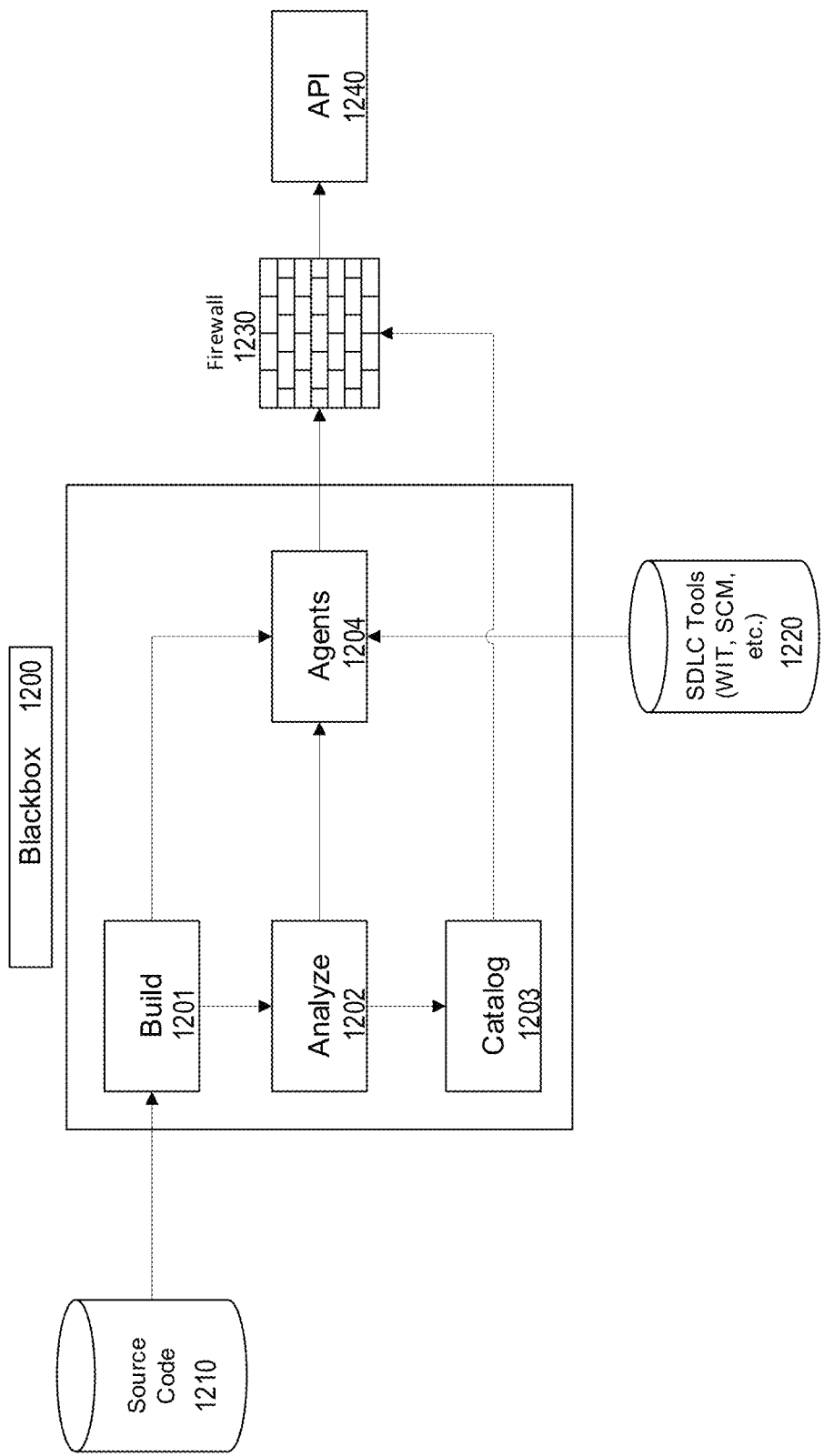
FIG. 12 illustrates an exemplary black box for use in a software business management system.

Referring now to FIG. 12, an exemplary black box 1200 for use in a software business management system is illustrated. In some aspects, the black box 1200 may be a physical or virtual appliance that may be designed to solve the problem of analyzing source code 1210 limiting the need for the source code 1210 to leave an organization's premises, wherein the black box 1200 may be located behind the organization's firewall 1230, without requiring the organization to install and configure a complex suite of tools.

In some embodiments, the black box 1200 may comprise a build service 1201, a quality analysis service 1202, and software discovery service 1203, which may provide a technology and dependency cataloging utility. In some implementations, the build service 1201 may be configured to pull the source code 1210 from a privately hosted source control repository in the organization's environment or from a cloud-hosted source control provider. In some embodiments, the code may be statistically analyzed for quality and security issues by the quality analysis service 1202.

In some aspects, a software discovery service 1203 may catalog the technologies and dependencies in the application and reports its data up to the cloud API 1240 through the firewall 1230. In some implementations, after the build, agents 1204 may pull metadata from the build service 1201, quality analysis service 1202, and SDLC tools 1220 in the environment (such as work item tracking or source control), and may report the metadata up to the cloud API 1240 through the firewall 1230 without the code leaving the environment.

Figure 13:
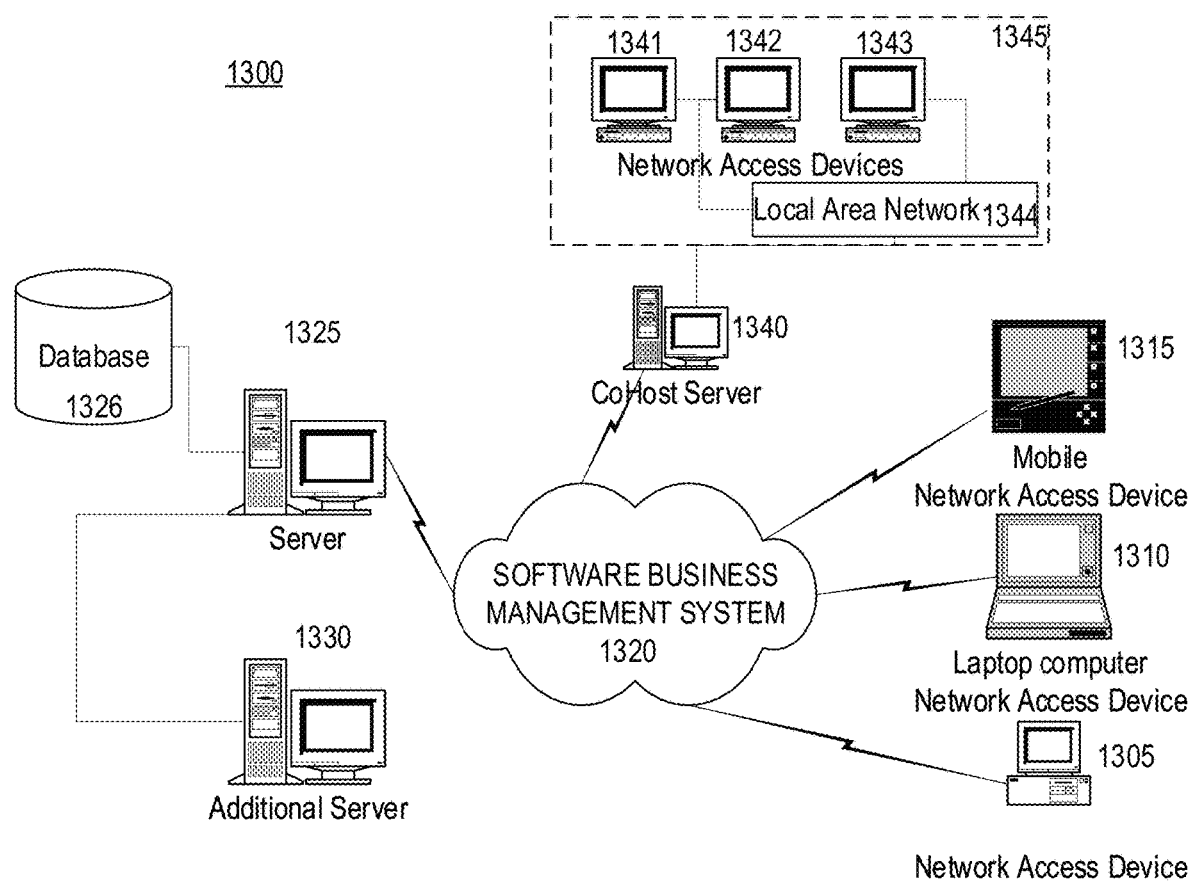
FIG. 13 illustrates an exemplary processing and interface system.

Referring now to FIG. 13, an exemplary processing and interface system 1300 is illustrated. In some aspects, access devices 1315, 1310, 1305, such as a paired portable device 1315 or laptop computer 1310 may be able to communicate with an external server 1325 through a software business management system 1320 through cloud-based communications. The external server 1325 may be in logical communication with a database 1326, which may comprise data related to software identification information and associated profile information. In some embodiments, the external server 1325 may be in logical communication with an additional server 1330, which may comprise supplemental processing capabilities. In some implementations, the external server 1325 may be in logical communication with multiple databases. In some aspects, the software business management system 1320 may be running on an external server 1325.

In some aspects, the server 1325 and access devices 1305, 1310, 1315 may be able to communicate with a cohost server 1340 through a software business management system 1320. The cohost server 1340 may be in logical communication with an internal network 1345 comprising network access devices 1341, 1342, 1343 and a local area network 1344.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multi-tasking and parallel processing may be advantageous. Nevertheless, it will be understood that various modifications may be made without departing from the spirit and scope of the claimed disclosure.

What is claimed is:

1. A software business management system for visualizing and measuring software assets, wherein the system comprises:
   a discovery tool installable on one or more organization servers, wherein the discovery tool is configured to:
      access an organization environment;
      identify a plurality of organization applications;
      monitor the plurality of organization applications;
      collect organization application data;
   an integration engine configured to:
      convert or translate the organization application data into universal data, wherein the universal data comprises a common format;
      store the universal data in an external data warehouse; and
   an analytics engine configured to:
      access the external data warehouse; and
      analyze the universal data, wherein an analysis output comprises insights related to the plurality of organization applications, and wherein insights comprise predefined measurements related to one or more cost, quality, risk and security vulnerabilities related to one or more the organization environment or at least a portion of the plurality of organization applications, wherein the analysis comprises identifying outlier data within the universal data and separating the outliers into acceptable departures and unacceptable departures, and wherein the analysis further comprises a software decay assessment of at least one of the plurality of organization applications, wherein the software decay assessment is based at least in part on the outlier data.

2. The system of claim 1, wherein the organization application data further comprises user-generated data.

3. The system of claim 1, wherein the discovery tool is further configured to score the plurality of organization applications.

4. The system of claim 1, wherein the discovery tool is further configured to:
   identify inventory within the organization environment;
   monitor the inventory; and
   collect inventory data.

5. The system of claim 1, wherein the analysis comprises a performance analysis of at least a portion of the organization applications.

6. The system of claim 1 further comprising an administrative interface, wherein the analytics engine is further configured to create reports based on the insights, and wherein the reports are viewable in the administrative interface.

7. The system of claim 1, further comprising at least one authentication mechanism, wherein the at least one authentication mechanism secures a transmission of organization application data from the organization servers to the external data warehouse.

8. The system of claim 1, wherein the discovery tool is further configured to transmit at least a portion of the organization application data to the external data warehouse.

9. A method for visualizing and measuring software assets by a software business management system, wherein the method comprises the method steps of:
- accessing through use of a discovery tool installable on one or more organization servers an organization environment;
- identifying a plurality of organization applications;
- monitoring the plurality of organization applications;
- collecting organization application data;
- converting or translating through use of an integration engine the organization application data into universal data, wherein the universal data comprises a common format;
- storing the universal data in an external data warehouse; and
- analyzing the universal data through use of an analytics engine, wherein an analysis output comprises insights related to the plurality of organization applications, and wherein insights comprise predefined measurements related to one or more cost, quality, risk and security vulnerabilities related to one or more the organization environment or at least a portion of the plurality of organization applications, wherein the analysis comprises identifying outlier data within the universal data and separating the outliers into acceptable departures and unacceptable departures, and wherein the analysis further comprises a software decay assessment of at least one of the plurality of organization applications, wherein the software decay assessment is based at least in part on the outlier data.

10. The method of claim 9, wherein the organization application data further comprises user-generated data.

11. The method of claim 9, further comprising the method step of scoring the plurality of organization applications.

12. The method of claim 9, further comprising the method step of:
- identifying inventory within the organization environment;
- monitoring the inventory; and
- collecting inventory data.

13. The method claim 9, wherein the analysis comprises a performance analysis of at least a portion of the organization applications.

14. The method of claim 9 further comprising the method step of creating one or more reports based on the insights, and wherein the reports are viewable in an administrative interface.

15. The method of claim 9, wherein the accessing occurs through at least one authentication mechanism, wherein the at least one authentication mechanism secures a transmission of organization application data from organization servers to the external data warehouse.

16. The method of claim 9, further comprising the method step of transmitting at least a portion of the organization application data to the external data warehouse.

* * * * *